United States Patent
Clement et al.

(10) Patent No.: US 8,477,291 B2
(45) Date of Patent: Jul. 2, 2013

(54) SYSTEM AND METHOD FOR RANGING OF TARGETS

(75) Inventors: John E. Clement, Santa Barbara, CA (US); James F. Asbrock, Oceanside, CA (US); William O. McKeag, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 799 days.

(21) Appl. No.: 12/639,417

(22) Filed: Dec. 16, 2009

(65) Prior Publication Data

US 2011/0141453 A1    Jun. 16, 2011

(51) Int. Cl.
*G01C 3/08* (2006.01)
(52) U.S. Cl.
USPC .................................. 356/5.01; 356/5.04

(58) Field of Classification Search
USPC .................. 356/5.01, 5.04; 342/134, 135
See application file for complete search history.

(56) References Cited

U.S. PATENT DOCUMENTS 5,831,717 A * 11/1998 Ikebuchi ...................... 356/4.01
7,212,278 B2 * 5/2007 Doemens et al. ............ 356/5.01

* cited by examiner

*Primary Examiner* — Mark Hellner

(57) ABSTRACT

A method for ranging or targets may include transmitting a pulse of electromagnetic energy at a target. The method may also include generating a time-varying signal in response to receiving a first signal indicating transmission of the pulse of electromagnetic energy. Additionally, the method may include detecting a reflection of the pulse from the target. Moreover, the method may include generating a second signal indicating detection of the reflection. The method may further include generating a third signal substantially equivalent to the second signal delayed by predetermined delay. The method may also include sampling the time-varying signal in response to receiving the third signal.

23 Claims, 2 Drawing Sheets

SYSTEM AND METHOD FOR RANGING OF TARGETS

TECHNICAL FIELD

This disclosure relates in general to ranging of targets and more particularly to a ranging system and method for targets within a distance on the order of 5-10 feet or closer.

BACKGROUND

LIDAR (Light Detection and Ranging) is an optical remote sensing technology that measures properties of scattered and/or reflected light to find range and/or other information of a target. Analogous to radar technology, which uses radio waves in the non-visible spectrum, LIDAR determines the range to an object by measuring the time delay between transmission of a light pulse and detection of the reflected signal. LIDAR technology has been applied in numerous fields, including without limitation, geomatics, archaeology, geography, geology, geomorphology, seismology, remote sensing and atmospheric physics. A type of LIDAR uses laser pulses for ranging and is often referred to as LADAR (Laser Detection and Ranging).

Traditional LIDAR systems are often effective at detection and ranging for ranges of tens of meters or greater, but often have difficulty in providing accurate range measurements for nearer objects due to initiation and start-up transients and signal non-linearities that occur in traditional LIDAR circuitry.

SUMMARY OF THE DISCLOSURE

According to one embodiment, a method for ranging targets may include transmitting a pulse of electromagnetic energy at a target. The method may also include generating a time-varying signal in response to receiving a first signal indicating transmission of the pulse of electromagnetic energy. Additionally, the method may include detecting a reflection of the pulse from the target. Moreover, the method may include generating a second signal indicating detection of the reflection. The method may further include generating a third signal substantially equivalent to the second signal delayed by predetermined delay. The method may also include sampling the time-varying signal in response to receiving the third signal.

Technical advantages of certain embodiments may include the provision of ranging systems and techniques for ranging target objects at a distance on the order of a few meters or a few feet.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
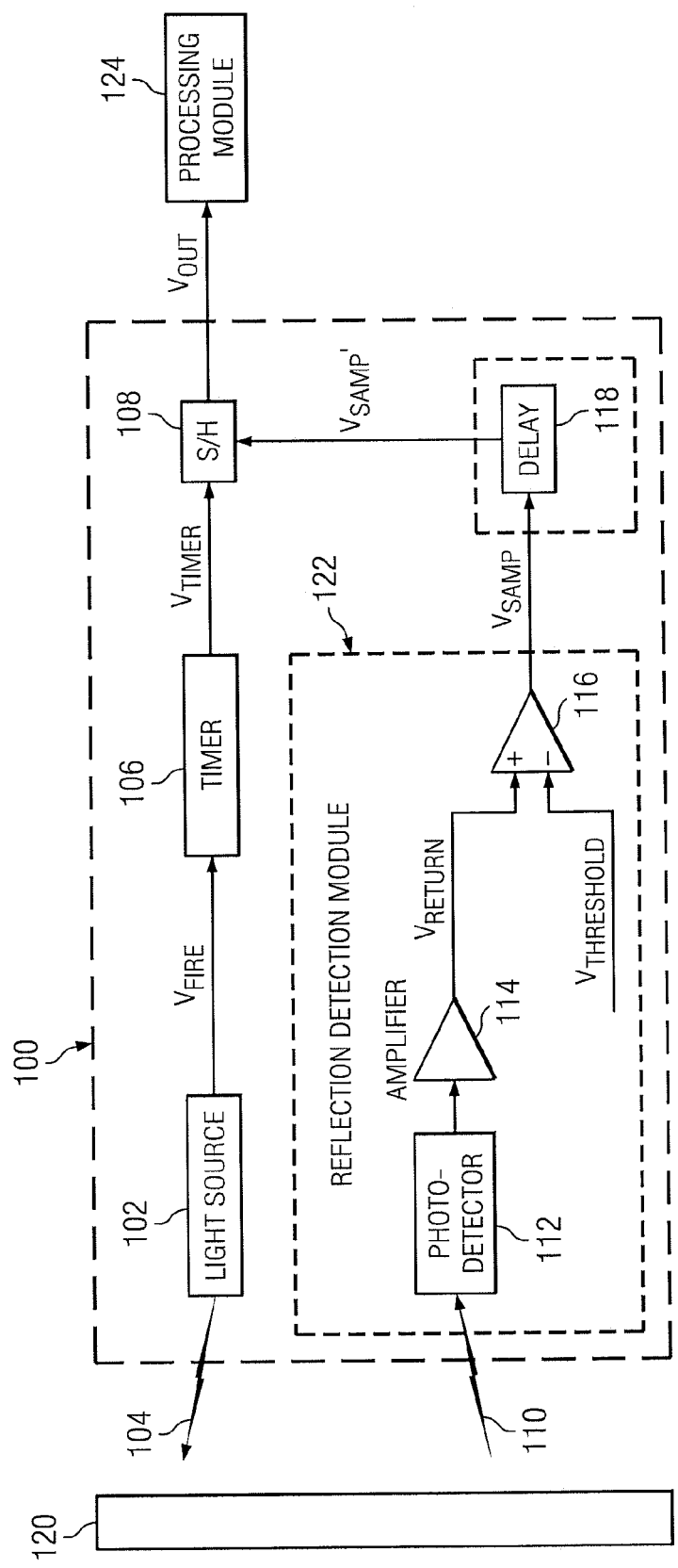
FIG. 1 illustrates a block diagram illustrating selected components of an example LIDAR system, in accordance with certain embodiments of the present disclosure.
Figure 2:
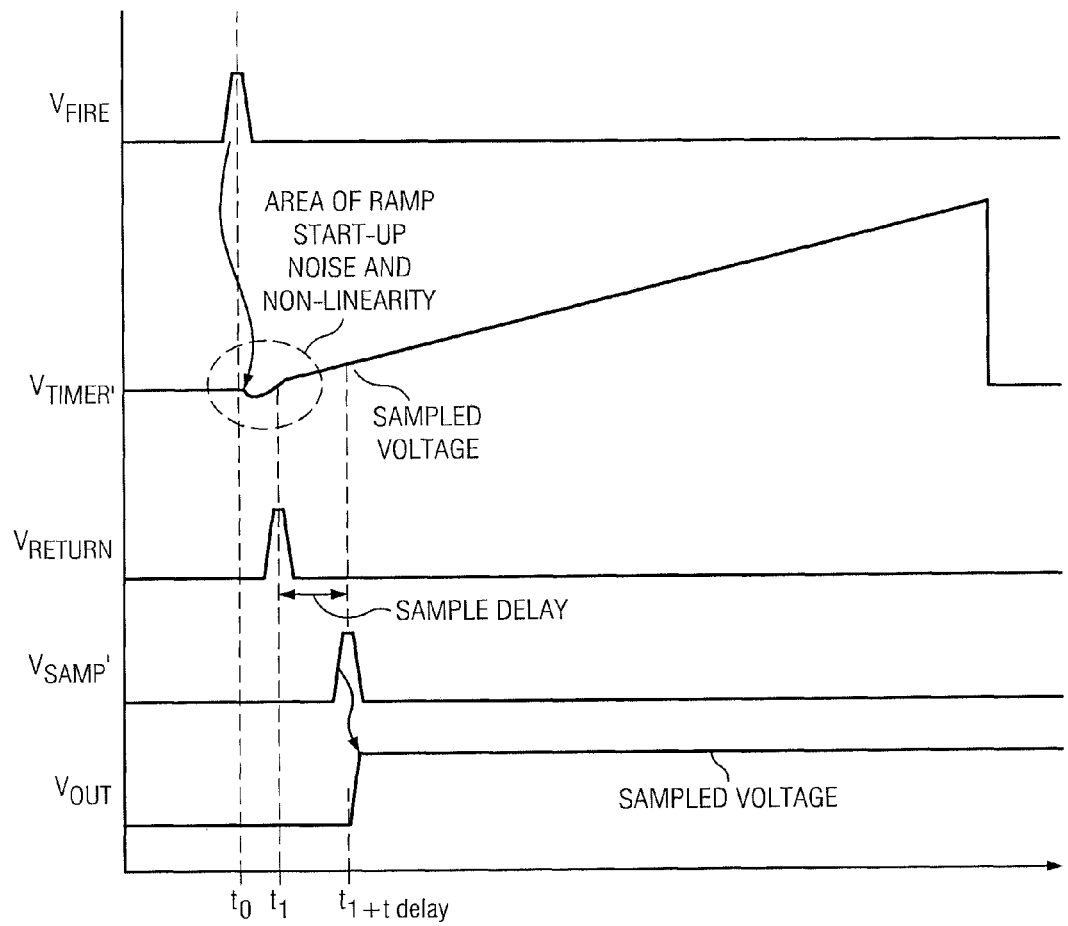
FIG. 2 illustrates an example graph of various signals within the LIDAR system depicted in FIG. 1 versus time, in accordance with certain embodiments of the present disclosure.

Embodiments of the present disclosure and its advantages are best understood by referring to FIGS. 1 through 2 of the drawings, like numerals being used for like and corresponding parts of the various drawings.

FIG. 1 illustrates a block diagram illustrating selected components of an example LIDAR system 100, in accordance with certain embodiments of the present disclosure. In some embodiments, LIDAR system may comprise a LADAR system. As shown in FIG. 1, LIDAR system 100 may include a light source 102, a timer 106, a sample-and-hold device 108, reflection detection module 122, and a delay device 118.

Light source 102 may be any system, device, or apparatus configured to emit electromagnetic energy 104 (e.g., a laser or light-emitting diode). In certain embodiments, the emitted electromagnetic energy will be within the visible spectrum. In the same or alternative embodiments, light source 102 may emit electromagnetic energy in one or more pulses. As shown in FIG. 1, light source 102 or another component of LIDAR system 100 may be configured to communicate a signal $v_{FIRE}$ wherein such signal is indicative of a time at which electromagnetic energy is emitted from light source 102 (e.g., in embodiments in which light source 102 emits pulses of electromagnetic energy 104, signal $v_{FIRE}$ may also pulse, such as shown in FIG. 2, for example, to indicate that the electromagnetic energy was emitted).

Timer 106 may be coupled to light source 102 and include any device, system or apparatus that provides generally increasing or a generally decreasing magnitude of analog or digital signal. In some embodiments, timer 106 may comprise an analog timer, such as a ramp generator that outputs an analog signal (e.g., a voltage) indicative of time. In other embodiments, timer 106 may comprise a digital timer. In embodiments in which timer 106 is an analog timer (e.g., a ramp generator), signal $v_{TIMER}$ may be a generally linear and/or generally monotonic analog signal.

In the same or alternative embodiments, timer 106 may begin timing in response to a triggering event. For example, as shown in FIGS. 1 and 2, timer 106 may be triggered by a signal (e.g., a pulse) received on $v_{FIRE}$.

Sample-and-hold device 108 may be communicatively coupled to timer 106 and the output of delay device 118 and may be any suitable device, system, or apparatus configured to receive a signal (e.g., an analog or digital time-varying signal communicated from timer 106) and, in response to a triggering event (e.g., a pulse on signal $V_{SAMP}'$ communicated from delay device 118) hold the sampled signal steady for a specified period of time to allow another device, system, or apparatus to perform an operation on the held signal. In embodiments in which sample-and-hold device 108 samples an analog signal, sample-and-hold device 108 may include a capacitor to store an analog voltage, and may also include an electronic switch or gate to alternately connect and disconnect the capacitor from the analog input to be sampled and held.

Reflection detection module 122 may include any device, system, or apparatus configured to detect a reflection 110, from a target object 120, of electromagnetic energy 104 emitted by light source 102, and convert such reflected electromagnetic energy into a signal indicative of the receipt of the detected reflection. As shown in FIG. 1, reflection detection module may include a photodetector 112, an amplifier 114, and a comparator 116.

Photodetector 112 may be any system, device, or apparatus configured to detect a reflection 110, from a target object 120, of electromagnetic energy 104 emitted by light source 102, and convert such reflected electromagnetic energy into an analog signal indicative of the intensity of the detected signal.

Amplifier 114 may be coupled to the output of photodetector 112 and may be any suitable device, system, or apparatus configured to receive an input signal (e.g., current or voltage) and amplify the input signal by a gain to produce an output signal that is a multiple of the input signal. In certain embodiments, amplifier 114 may include a non-inverting amplifier, an inverting amplifier, or any combination thereof. In addition, although only one amplifier 114 is depicted in FIG. 1, LIDAR system 100 may include any combination of pre-amplifiers, post-amplifiers, or other suitable devices configured to condition a signal output by photodetector 112 for use by other components of LIDAR system 100.

Comparator 116 may be coupled to the output of amplifier 114 and may include any device, system or apparatus that compares two analog signals (e.g., voltages or currents) at its inputs and switches its output between two values to indicate which is larger. For example, comparator 116 may output a logic 0 (or "low") if the analog signal on $V_{RETURN}$ is of a lower magnitude than the magnitude of analog signal on $V_{THRESHOLD}$, and may output a logic 1 (or "high") otherwise. Accordingly, comparator 116 may be thought of as a one-bit analog-to-digital converter.

Delay device 118 may be coupled to the output of comparator 116 and may include any system, device or apparatus configured to time shift or delay an analog signal at its input by a predetermined period of time. For example, if an analog signal at the input of delay device 118 is defined by the function v(t), delay device 118 may communicate a signal $v(t-t_{delay})$ at its output, wherein $t_{delay}$ is the predetermined delay. In some embodiments the delay of delay device 118 may be fixed, while in other embodiments, the delay of delay device 118 may be variable and/or programmable.

Processing module 124 may include any system, device, or apparatus configured to determine a distance between LIDAR system 100 and target object 120 based on a signal sample-and-hold device 108. Processing module may include, without limitation, a microprocessor, microcontroller, digital signal processor (DSP), application specific integrated circuit (ASIC), or any other digital or analog circuitry configured to interpret and/or execute program instructions and/or process data.

Example operation of LIDAR system 100 may be illustrated by reference to FIG. 2. FIG. 2 illustrates an example graph of various signals within LIDAR system 100 depicted in FIG. 1 versus time, in accordance with certain embodiments of the present disclosure. At a given time $t_0$, light source 102 may emit a pulse of electromagnetic energy towards target object 120. Substantially contemporaneous to emission of the pulse, light source 102 may communicate a signal $v_{FIRE}$ to timer 106 indicative of the emission of the pulse. As shown in FIG. 2, the signal $v_{FIRE}$ may itself be a pulse. In other embodiments, the signal $v_{FIRE}$ may be a step or have any other suitable signal response.

Such pulse on $V_{FIRE}$ may trigger timer 106 to begin outputting a timing signal at its output (e.g., timer 106 may begin ramping a signal $v_{TIMER}$ at its output in embodiments in which timer is an analog timer). As depicted in FIG. 2, timer 106 may experience noise and other transient effects when it is triggered (especially in those embodiments in which timer 106 is an analog timer/ramp generator), thus leading to non-linearity of $v_{TIMER}$ in a time region near $t_0$. Such nonlinear effects may last for tens of nanoseconds. Other generally undesirable effects may also occur in embodiments in which timer 106 is a digital timer (e.g., the timing signal at the output of timer 106 may be time-delayed with respect to the triggering signal at its input, such that the delay exceeds the round-trip travel time of electromagnetic energy 104 and reflection 110).

At a time $t_1 > t_0$, photodetector 112 may receive a reflection 110, from target object 120, of the pulse of electromagnetic energy 104 emitted by light source 102. Reflection 110 may be similar to the pulse of electromagnetic energy 104, except that reflection 110 may be delayed and/or of lower intensity. Upon receiving reflection 110, photodetector 112 may communicate a signal to amplifier 114 indicative of the intensity of received reflection 110 over time. Amplifier 114 may amplify such signal to produce a signal $v_{RETURN}$ which may also be indicative of the intensity of received reflection 110 over time. Comparator 116 may compare $V_{RETURN}$ to a threshold constant $V_{THRESHOLD}$, and may output a digital signal $v_{SAMP}$ based on the comparison. For example, comparator may output a logic 1 (or "high") when $V_{RETURN} > V_{THRESHOLD}$, and output a logic 0 (or "low") otherwise.

Delay device 118 may time shift $v_{SAMP}$ to produce a signal $v_{SAMP}'$ at its output such that $v_{SAMP}'(t)=v_{SAMP}(t-t_{delay})$ wherein $t_{delay}$ is the predetermined time delay of delay device 118.

At a time $t_1 + t_{delay}$, the signal on $v_{SAMP}'$ may trigger sample-and-hold device 108 to sample and hold the signal $v_{TIMER}$ present at the input of sample-and-hold device 108. Processing module 124 may, based on such sampled and held signal (shown as $v_{OUT}$, in FIG. 2) determine a distance, D, between LIDAR system 100 and target object 120, as shown below.

Given a time $t_0$ at which a pulse of electromagnetic energy 104 is emitted and a time $t_1$ at which a reflection 110 of the pulse is received from a target object 120, the distance D between LIDAR system 100 and target object 120 may be given by the equation:

$$D=(t_1-t_0) \times c/2$$

where c is the speed of light. In addition, in embodiments in which timer 106 provides a linear ramp such that $v_{TIMER}(t) = R \times t$ and R is the linear rate in increase of $v_{TIMER}$ over time, then the value of $v_{TIMER}$ when it is sampled and held at time $t_1 + t_{delay}$, and accordingly the value of $v_{OUT}$ for $t > t_1 + t_{delay}$ is governed by the equation:

$$v_{OUT} = R \times (t_1 + t_{delay} - t_0)$$

which may be rearranged as:

$$t_1 - t_0 = v_{OUT}/R - t_{delay}$$

Substituting the above equation into the equation for distance D above, D may be found by the equation:

$$D=(v_{OUT}/R - t_{delay}) \times c/2$$

Although the foregoing discusses the value $t_{delay}$ as including the delay induced by delay device 118, $t_{delay}$ may also include propagation delays inherent in other components of LIDAR system 100 (e.g., photodetector 112, amplifier 114, comparator 116, sample-and-hold device 108, etc.).

The systems and methods disclosed herein may advantageously allow for detection and ranging of target objects that are on the order of a few feet or few meters in distance away from a LIDAR system. To illustrate, if target object 120 of FIG. 1 were 10 feet away from LIDAR system 100, the time between transmission of pulse 104 and receipt of reflection 110 may be approximately 20 nanoseconds. As mentioned above, start-up noise and non-linearities on the output of timer 106 in embodiments in which timer 106 is an analog timer may be on the order of 100 nanoseconds. Thus, in the absence of delay device 118, sample-and-hold device 108 might sample $V_{TIMER}$ in its non-linear region (e.g., at time $t_1$ in FIG. 2), leading to an inaccurate measurement of range. In embodiments in which timer 106 is a digital timer, sample-and-hold device 108 might, in the absence of delay device 118, sample the output of timer 106 before timer 106 has begun timing in response to the trigger at its input, also potentially leading to an inaccurate measurement of range.

In addition, because timer 106 of LIDAR system 106 is triggered by a signal corresponding to pulse 104, as opposed to being triggered by a signal corresponding to the arming of light source 102 (as is often the case in traditional approaches), measurement inaccuracies associated with accounting for the delay between arming and firing may be avoided.

Systems and methods disclosed herein may have many applications. For example, LIDAR system 100 may be an integral part of a vehicle (e.g., a waterborne vessel, automobile, a space vehicle, or other suitable vehicle) for which LIDAR system 100 may assist in navigation (e.g., harbor navigation by waterborne vessel, navigation of in-orbit space vehicles, parking by automobiles, etc.).

Although the embodiments in the disclosure have been described in detail, numerous changes, substitutions, variations, alterations, and modifications may be ascertained by those skilled in the art. Additionally or alternatively, while the disclosure is described predominantly in reference to visible detectors, the embodiments disclosed herein may be utilized with many types of detectors including, but not limited to, visible, infrared, ultraviolet, x-ray, or other radiation detectors. It is intended that the present disclosure encompass all such changes, substitutions, variations, alterations and modifications as falling within the spirit and scope of the appended claims.

What is claimed is:

1. A system, comprising:
    a light source configured to transmit a pulse of electromagnetic energy at a target;
    a timer configured to output a time-varying signal in response to receiving a first signal indicating that the light source transmitted the pulse of electromagnetic energy;
    a reflection detection module configured to detect a reflection of the pulse from the target and output a second signal indicating detection of the reflection;
    a delay device configured to receive the second signal and to output a third signal substantially equivalent to the second signal delayed by predetermined delay; and
    a sample-and-hold device configured to sample the time-varying signal in response to receiving the third signal.

2. A system according to claim 1, further comprising a processing module configured to determine a range associated with the target based on the sampled time-varying signal.

3. A system according to claim 1, wherein the light source is a laser.

4. A system according to claim 1, wherein the pulse includes electromagnetic energy in the visible spectrum.

5. A system according to claim 1, the light source further configured to generate the first signal and communicate it to the timer.

6. A system according to claim 1, wherein the timer is an analog timer.

7. A system according to claim 6, wherein the timer is a ramp generator.

8. A system according to claim 7, wherein the time-varying signal is a time-varying analog signal generated by the ramp generator response to receiving the first signal.

9. A system according to claim 8, wherein the generally linear, time-varying analog signal includes a non-linear region associated with a time in which the ramp generator receives the first signal.

10. A system according to claim 1, wherein the timer is a digital timer.

11. A system according to claim 1, wherein at least one of the first signal, the second signal, the third signal, and the time-varying signal is a voltage signal.

12. A method for ranging a target, comprising:
    transmitting a pulse of electromagnetic energy at a target;
    generating a time-varying signal in response to receiving a first signal indicating transmission of the pulse of electromagnetic energy;
    detecting a reflection of the pulse from the target;
    generating a second signal indicating detection of the reflection;
    generating a third signal substantially equivalent to the second signal delayed by predetermined delay; and
    sampling the time-varying signal in response to receiving the third signal.

13. A method according to claim 12, further comprising determining a range associated with the target based on the sampled time-varying signal.

14. A method according to claim 12, wherein the pulse of electromagnetic energy includes laser light.

15. A method according to claim 12, wherein the pulse includes electromagnetic energy in the visible spectrum.

16. A method according to claim 12, wherein the time-varying signal is an analog signal.

17. A method according to claim 16, wherein the analog signal is a generally linear, time-varying analog signal.

18. A method according to claim 16, wherein the analog signal includes a non-linear region associated with a time in which the ramp generator receives the first signal.

19. A method according to claim 12, wherein the time-varying signal is a digital signal.

20. A vehicle, comprising:
    a propulsion system for propelling the vehicle; and
    a ranging system comprising:
        a light source configured to transmit a pulse of electromagnetic energy at a target;
        a timer configured to output a time-varying signal in response to receiving a first signal indicating that the light source transmitted the pulse of electromagnetic energy;
        a reflection detection module configured to detect a reflection of the pulse from the target and output a second signal indicating detection of the reflection;
        a delay device configured to receive the second signal and to output a third signal substantially equivalent to the second signal delayed by predetermined delay;
        a sample-and-hold device configured to sample the time-varying signal in response to receiving the third signal; and
        a processing module configured to determine a range between the vehicle and the target based on the sampled time-varying signal.

21. A vehicle according to claim 20, wherein the timer is an analog timer.

22. A vehicle according to claim 20, wherein the timer is an analog timer.

23. A vehicle according to claim 20, wherein the vehicle is one of an automobile, a waterborne vessel, and a space vehicle.

* * * * *

UNITED STATES PATENT AND TRADEMARK OFFICE
CERTIFICATE OF CORRECTION

| | | |
|---|---|---|
| PATENT NO. | : 8,477,291 B2 | Page 1 of 1 |
| APPLICATION NO. | : 12/639417 | |
| DATED | : July 2, 2013 | |
| INVENTOR(S) | : John E. Clement, James F. Asbrock and William O. McKeag | |

It is certified that error appears in the above-identified patent and that said Letters Patent is hereby corrected as shown below:

In the Specifications

After the section entitled "Technical Field" on Column 1, line 10 of the patent, please insert the following section:

-- GOVERNMENT RIGHTS

This invention was made with Government Support under contract number 08CA00027 awarded by the Department of Defense. The Government may have certain rights in the invention. --

Signed and Sealed this
Twenty-eighth Day of January, 2014

Michelle K. Lee
*Deputy Director of the United States Patent and Trademark Office*